United States Patent [19]
Williams

[11] 3,789,698
[45] Feb. 5, 1974

[54] AUTOMATIC SHIFT FOR A TRANSMISSION

[75] Inventor: Richard H. Williams, Indianapolis, Ind.

[73] Assignee: General Motors Corporation, Detroit, Mich.

[22] Filed: May 12, 1972

[21] Appl. No.: 252,858

[52] U.S. Cl. ............................ 74/752 C, 74/868
[51] Int. Cl. ..................... B60k 21/00, F16h 3/74
[58] Field of Search ............... 74/752 C, 867–869

[56] References Cited
UNITED STATES PATENTS
3,313,183  4/1967  Bailey et al. ................... 74/752 C
3,425,299  2/1969  Fisher ............................ 74/752 C

*Primary Examiner*—Arthur T. McKeon
*Attorney, Agent, or Firm*—A. M. Heiter

[57] ABSTRACT

The transmission shown has a gear set providing three forward ratio drives and a reverse drive each established by a fluid motor operated friction device, a brake or clutch. The power shift control system has a manual selector valve operative to connect main line fluid pressure in reverse position to a reverse brake line to establish reverse, in first position to a first ratio drive brake line to establish low drive, in second position to a manual second ratio drive feed line connected to a shuttle valve and in second third position to a second-third ratio drive feed line connected to an input governor controlled automatic second-third shift valve. On a first-second manual valve shift or a third-second manual valve shift, when permitted by the inhibitor, the second drive feed pressure moves the shuttle valve and feeds the second brake line to engage second ratio drive. The manual valve in second-third position provides the second-third feed pressure which is connected by the downshifted automatic shift valve to an automatic second feed line to act on the shuttle valve to feed the second brake line to establish second drive and by the input speed upshifted automatic shift valve to the third drive clutch line to establish high drive. The inhibitor permits upshifts but prevents manual valve downshifts at speeds which would cause excessive input speeds after the downshift. Downshifting from the second-third position to second position is inhibited while the automatic valve is upshifted. The inhibitor is directly controlled by governor pressure to inhibit second position to first position downshifts.

9 Claims, 1 Drawing Figure

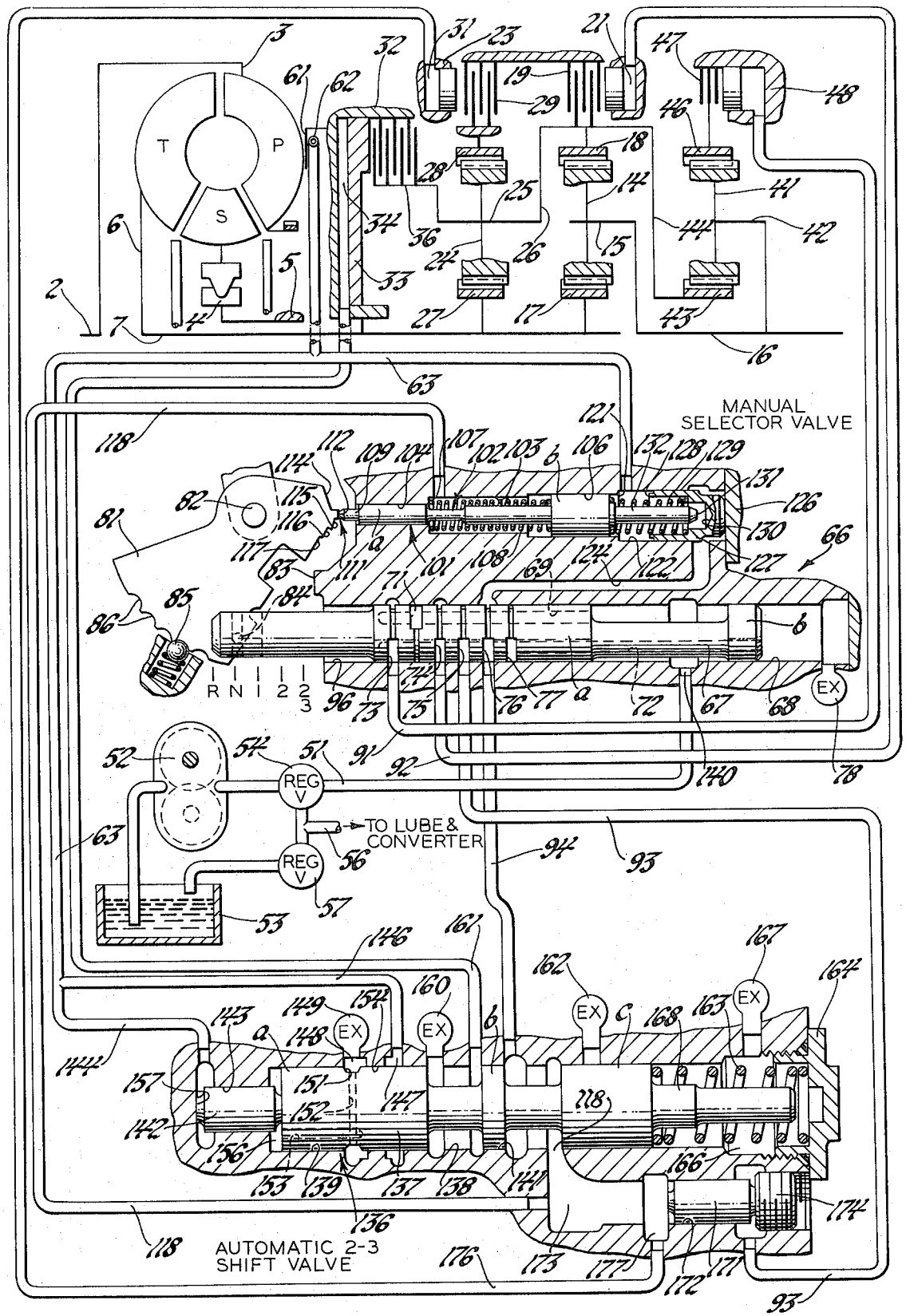

3,789,698

AUTOMATIC SHIFT FOR A TRANSMISSION

The invention herein described was made in the course of work under contract of subcontract thereunder with the Department of Defense.

This invention relates to transmissions and particularly to a control system for automatic transmissions having manual and automatic speed responsive controls.

This invention relates to power shifting multi ratio drive gearing having a plurality of fluid actuated friction devices each respectively actuated to engage a plurality of forward drive ratios and an improved control system providing a manual shift control and a speed responsive automatic shift control with an improved coordination interconnection and improved inhibitor control of the manual shift control. The manual shirf control and the automatic shift control are coordinated by a relay valve so the automatic shift control is continuously functioning in response to the speed governor and is unencumbered by overcontrol devices. The selective inhibitor overcontrol of the manual shift control is responsive to the automatic shift control to inhibit manual control causing a ratio drive downshift above proper predetermined speeds and permits manual shift not causing a ratio drive downshift without inhibitor speed control.

The invention is disclosed in a three speed transmission having first, second and third forward ratio drives and a manual control valve having first, second and second-third positions. One feature of the invention involves the movement of the manual control valve between the second position, a manual hold position in which only second ratio drive is established and a second-third position, an automatic shift position in which either second or third may be established by a governor controlled automatic shift valve coordinated by a shuttle relay valve without modification of the functioning of the governor controlled automatic shift valve. Another feature involves the inhibitor control of the manual valve and its modification by automatic shift valve position for control of a second-third position to a second position manual downshift for speed responsive downshift inhibiting when the automatic shift valve is upshifted and a third to second ratio shift occurs and permitting such manual shift when the automatic shift valve is downshifted and no ratio shift occurs. These inhibitorscontrols have as an added feature speed responsive control of inhibitor controls manual second to first position shift of the manual valve when a second to first ratio shift occurs. Since these features involve two or three positions of the manual valve, the first, second and second-high manual valve positions may be respectively called a lower, a low and a low-high position and the ratios, a lower, a low and a high ratio drive.

In the second or low position, the manual shift valve connects a source of pressure to a manual low feed signal line and in the low-high position connects a source of pressure to a low-high feed signal line and in each position exhausts the line not connected to the source. The manual low signal line is connected independent of the automatic shift valve, by a shuttle relay valve to the low ratio friction device for engaging the low ratio. The low-high signal line, when the automatic shift valve is in the downshifted position, is connected to an automatic low signal line which acts on the shuttle valve.

Since the manual low signal line pressure is exhausted at the manual valve, the automatic low signal line pressure is connected to the low ratio apply line for actuating the friction device for engaging low ratio. When the automatic shift valve upshifts, the low-high signal line is connected to the high ratio drive line to actuate the high friction device for engaging the high ratio and the automatic low signal line is connected through the shift valve to exhaust for disengaging the low friction device and the low ratio drive. In this system, the automatic shift valve is responsive to automatic control by a speed governor signal. Known automatic controls responsive to speed and torque demand may also be used. The automatic shift valve is not disabled or overcontrolled, i.e., by line pressure, and thus functions continuously in response to the automatic speed signal so that it is always automatically positioned when a low to low-high manual shift is made to avoid delay in engaging the proper drive ratio in accordance with the automatic control.

When the manual shift valve is in the low-high position providing the low-high signal pressure and the automatic shift valve is in the downshifted position providing the automatic low feed pressure, the shift inhibitor valve is automatically positioned in its second position permitting a manual downshift from the low-high position to the low position. After automatic upshift through the higher ratio drive the automatic low ratio feed pressure is exhausted and this returns the inhibitor to governor control which inhibits manual downshift of the manual valve at a speed above the automatic downshift speed to prevent downshifting at excessively high speed. The manual valve movement between the first, second and second-third position, designated as lower, low and low-high positions, provides in the lower position direct fluid supply to the lower ratio engaging device for engagement of the lower ratio. The manual valve is inhibited by an inhibitor solely under the control of input governor pressure to prevent a downshift from the lower to neutral position and from the low to the lower position at speeds which would be considered excessive. The manual valve upshifts are not inhibited. Thus, the manual valve inhibitor automatically functions in coordination with the manual shift valve and automatic shift valve positions to provide speed controlled downshift inhibition of the manual valve when such downshift will cause a ratio downshift in the transmission and permit a downshift at any speed where such downshift will not cause a ratio downshift in the transmission.

An input speed governor is used to control the inhibitor function, since the inhibitor is intended to prevent engine overspeed. The input speed governor is also used to control the automatic shift valve to provide upshifts and downshifts in a fixed relation to output speed. The governor signal acts on a small area of the automatic shift valve in the downshift position to effect an upshift and on a larger area in the upshifted position to control a downshift. The downshift control area is larger than the upshift control area to correct on upshift for the ratio change which causes the input speed to be reduced relative to output speed so that the governor force on the automatic shift valve remains the same relative to output speed and further increased to provide governor hysteresis so downshifts occur at a lower output speed than the output speed at which upshifts occur.

These and other features of the invention will be more apparent from the following description of a preferred embodiment illustrated in the drawing which schematically shows the transmission gearing and control system.

The transmission has an input shaft 2 driving the torque converter housing 3, which drives the torque converter pump P to circulate fluid through the turbine T and the stator S which is held by the one-way brake 4 attached to the grounded sleeve 5. The turbine is connected by a hub 6 to drive an intermediate shaft 7. The first ratio drive planetary gear set has planetary pinions 14 mounted on a carrier 15 which is connected to drive the output shaft 16. The pinions mesh with sun gear 17 driven by intermediate shaft 7 and ring gear 18 which may be retarded or held by the first brake 19 when engaged on the supply of fluid by the fluid motor 21 to establish first ratio drive, the lowest ratio drive. The second gear set has planetary pinions 24 mounted on a carrier 25 which is connected by annular member 26 to drive the ring gear 18. The pinions 24 mesh with sun gear 27 driven by shaft 7 and ring gear 28 which may be retarded by the second brake 29 when engaged by the second motor 31 and the other motors to establish second ratio drive, a compound drive employing the low and intermediate gear sets. The first and second motors 21 and 31 are conventional motors having an annular piston mounted in an annular cylinder on the fixed housing 23. The intermediate shaft 7 is also connected to drive the hub 32. The third motor has a piston 33 in the cylinder 34 in the hub. On the supply of fluid, the piston is moved to engage the third clutch 36 which connects the hub 32 driven by shaft 7 to the carrier 25 to lock up the gearing for forward one to one drive, a high ratio third drive. The clutch is of the plate type with alternate plates splined to hub 32 and intermediate plates splined to a part of carrier 25.

In the reverse gear set the planetary pinions 41 are mounted on a carrier 42 drive connected to the output shaft 16. The pinions 41 mesh with a sun gear 43 drive connected by annular member 44 to ring gear 18 and a ring gear 46 connected to brake 47. When fluid is supplied to fluid motor 48 to engage brake 47 to hold ring gear 46, and the other servo motors are exhausted to disengage the other brakes and the clutch, the transmission is in reverse drive, a compound drive with the first gear set. The motors are selectively actuated on the supply of fluid thereto and exhaust of other motors to engage the respective brake or the clutch. Each brake has alternate plates splined to the housing and intermediate plates splined to the associated ring gear. Retraction springs (not shown) release the brakes and the clutch.

This multi ratio drive gear unit or means has servo motors or fluid actuated devices selectively operable for establishing a first or lower, a second or low and a third or high drive ratio.

Controls

Fluid control pressure or main line pressure is supplied to the main line 51 by an input driven pump 52 or conventional combined input and output driven pumps. The pump 52 draws fluid from sump 53 and delivers it to the main line pressure regulator valve 54, a conventional regulating valve, regulating fluid pressure in the main line 51 and connecting overage to lubrication and converter feed line 56. When main line pressure is at the regulated value, the overage is connected to the lubrication and converter feed line 56. The lubrication and converter pressure relief valve 57 limits lubrication and converter feed pressure at a lower value than main line pressure.

The pitot governor has an annular can 61 open at the internal perimater and fixed to the housing 32 rotating with shaft 7. Oil is fed from a suitable restricted jet or gravity feed from the lubrication and converter feed line or a branch thereof or the main line into the open internal perimeter to keep the can filled. The pitot tube 62 has an open end to receive impingement of the oil rotating with can 61 to provide a static pressure head in the pitot line 63 which varies with the speed of shaft 7, the input shaft to the gearing.

The manual selector valve 66 has a valve element 67 having equal diameter $a$ and $b$ located in a bore 68. The space between the lands connects with the axial supply bore 69 which feeds the port 71 in land $a$. The axial exhaust bore 72 connects to exhaust ports 73, 74, 75, 76 and 77 in land $a$ through the valve element to the end of land $b$ where it is connected to exhaust 78. The manually moved cam member 81 is pivotally mounted on a pin 82 fixed to the valve body 83 and has a fixed pin 84 in cross slot in the valve member 67 to move it to reverse R, neutral N, first 1, second 2, and second-third 2-3 drive positions. The spring loaded ball detent 85 located in the fixed housing engages a detent recess 86 for each of these valve positions to resiliently hold the valve in each position. The main line 51 at port 140 is connected to the bore 68 between the lands $a$ and $b$ in all valve positions to feed the supply bore 69 and port 71 which selectively feeds the reverse brake line 91, the first brake line 92, the manual second feed or signal line 93 and the second third feed or signal line 94 as indicated by F for feed to the line in the following table. The above exhaust ports 73, 74, 75, 76 and 77, bore 72 and exhaust 78 at one end and exhaust 96, the open end of the bore at the opposite end of the valve provide exhaust from all the other lines except the one selected line as indicated by E in the following table.

| Man. Sel. V. | Rev. Brake Line | Low Brake Line | Int. Feed Line | Int.-Hi. Feed Line |
|---|---|---|---|---|
| 66 | 91 | 92 | 93 | 94 |
| 2-3 | E | E | E | F |
| 2 | E | E | F | E |
| 1 | E | F | E | E |
| N | E | E | E | E |
| R | F | E | E | E |

The shift inhibitor 101 has a plunger or piston member 102 having a small diameter land $a$ and an intermediate diameter land $b$ mounted in a stepped bore 103 having a small diameter portion 104 for the land $a$ and an intermediate diameter portion 106 for the land $b$ with an intermediate step 107 between these bore portions providing a seat for biasing spring 108 which engages the land $b$ to bias plunger 102 toward a noninhibiting position. In this non-inhibiting position, the cam follower or inhibitor end 109 of plunger 102 is disengaged from the stepped cams 111 on cam member 81. The largest radius, or highest cam step 112, is for neutral. The forward speed cam steps with increasing speed ratio have a sequentially reduced radius about the pivot 82. The reverse cam stem 114 is on one side of the neutral cam step 112 and the forward cam steps 115, 116 and 117 respectively for the 1, 2 and 2-3 manual valve positions are on the other side of the neutral cam step. The bore 106 between the lands *a* and *b* of plunger 102 which provides a chamber for spring 108 is connected at step 107 to the automatic second feed line 118 so automatic second feed pressure acts with the spring 108 on the differential area of lands *b* and *a* to overcome governor pressure and move the plunger. The governor pressure line 63 is connected to the bore 103 at the step 121 between the intermediate diameter bore portion 106 and a large diameter bore portion 122 so the governor acts on the end of land *b* of plunger 102 to move the plunger to the left toward the cams 111 compressing the spring 108 to variably position the height of the follower 109 proportional to input speed so that at certain speeds downshifts cannot be made in order to prevent injury to the engine by downshifting at excessive speeds where after the downshift the engine would be driven by the load or vehicle at a speed above the maximum desirable engine speed. The second third feed branch 124 of line 94 is connected to the end of bore 122 closed by the closure member 126 so that this pressure, supplied in the second-third position of the manual valve, acts on the piston plug 127 to move this piston a predetermined distance to a predetermined position in which the piston end 128 engages with the shoulder or step 121 of the bore. The main line pressure supplied via the second-third feed branch line 124 always moves the piston 127 against the opposing biasing force of governor pressure and spring 129 positioned between the piston 127 and the land *b* of plunger 102. When the automatic second pressure is supplied by the line 118 and acts on the differential area of lands *a* and *b* of plunger 102 together with the spring 108 to overcome the governor pressure acting on the land *b* and the spring 129 both acting in the opposite direction, the inner end surface 130 of piston 127 is engaged by the end 131 of the spring guide and stop portion 132 of plunger 102 to position the cam follower 109 in a predetermined speed downshift inhibiting position. The inhibitor plunger 102 is so positioned when the manual valve is in the second-third position and the automatic shift valve is in the downshift position providing second ratio drive. Thus the manual shift valve may be freely shifted between second position and second-third position when the automatic shift valve is in the downshifted position as there is no ratio change on such manual shift. When the automatic shift valve upshifts the automatic second drive signal line 118 is exhausted and the inhibitor valve is again controlled by governor pressure and the balance between governor pressure, spring 129 and spring 108 is such that a manual downshift from the second-third speed position to the second speed position can be made at a slightly higher speed than the automatic shift valve downshifts. When the manual valve is in the second speed position, both the second-third feed line 124 and the automatic second drive signal line 118 are exhausted and governor pressure acting in the same way positions inhibitor cam 109 relative to the first ratio drive step 115 to prevent a manual second to first downshift at excessive speeds.

The automatic control valve means, which includes the automatic shift valve 136 and shuttle valve 171, controls the shift valve 136 and shuttle valve 171, controls the shift in conjunction with the manual valve 66.

The automatic 2-3 shift valve 136 has a valve element 137 having a small land *a* and slightly larger equal diameter lands *b* and *c* positioned in a stepped bore 138 having a small diameter portion 139 at one end and at the other end a larger diameter bore portion 141. At the free end of land *a* of valve element 137 there is a small diameter governor piston 142 in a small diameter bore 143 continued at the end of the main bore 141. The input governor pressure line has a branch 144 connected to the closed end of bore 143 and governor pressure acts on the governor piston 142 to move the piston 142 and the valve element 137 in an upshift direction. The input governor line 63 also has a branch 146 connected at port 147 to the bore portion 139 which port is blocked by the land *a* when the automatic shift valve element 137 is in the downshifted position shown. An annular exhaust port 148 is connected to exhaust 149. Land *a* of valve element 137 has two peripherally limited ports 151 which are connected by the cross passage 152 which is in turn connected by the axial passage 153 to the free end of land *a*. The bore portion 154 between the governor pressure inlet port 147 and exhaust port 148 is slightly longer than the axial width of port 151 in the land *a* of the valve element but only by about several thousandths of an inch to prevent trapping fluid in chamber 156 which could prevent downshifting movement of the shift valve. The ports 151 are connected by the passage 152, 153 to the chamber 156 at the end of the bore portion 139 created by the fact that the governor piston 142 has sufficient length between the end 157 of its bore to engage the land *a* and space it from the end of the bore 139. The ports 151 are flats cut in the cylindrical surface of land *a* and are approximately square. Thus, both ports 151 extend peripherally over a very small portion of the cylindrical surface of land *a* in order to prevent leakage from port 147 between land *a* and bore 139 to exhaust 148 and to chamber 156.

When the valve element 137 is in the downshift position, the third ratio drive clutch line 161 which feeds the third ratio clutch cylinder 34 is connected to the bore 138 between lands *a* and *b* and adjacent land *b* and connected to the exhaust 160 similarly connected to bore 138 adjacent land *a*. Second-third feed line 94 is connected to the bore 141 between lands *b* and *c* adjacent land *b* while the automatic second feed line 118 is connected to this bore adjacent land *c*. This automatic second feed line 118 extends through the end 173 of bore 172 or may be a separate line connected to the end 173 of bore 172. The exhaust 162 is blocked by land *c*.

The downshift biasing spring 163 is positioned at the end of bore 141 and seats on a bore closure member 164 and biases the valve element 137 to the downshift position shown. The spring chamber portion 166 of bore 141 is exhausted by exhaust 167. The valve element 137 has a spring guide and stop portion 168 which guides spring 163 and abuts closure 164 to limit upshift movement.

A shuttle relay valve element 171 positioned in a bore 172 which has a dead end or closed end 173 at the port for automatic second feed line 118 and a removable closure member 174 at the opposite end of bore 172 at the port of the manual second feed line 93. The second ratio drive feed line 176 which feeds the second ratio motor 31 is connected at port 177 centrally of the bore 172 between the ends 173 and 174.

In the manual valve second position, the manual second feed line 93 supplies fluid pressure to move the shuttle valve element 171 to the end 173 of bore 172 to feed the port 177 and second brake line 176 to establish the second ratio drive. Though shift valve 136 can be upshifted, since second third feed line 94 is exhausted at the manual valve, third feed line 161 is exhausted in both shaft valve positions. On a manual valve shift from the second position to the second-third position, the second ratio feed line 93 is exhausted and the second-third ratio feed line 94 is supplied with fluid pressure. If the automatic shift valve 136 is in the downshift position as shown, the second third feed line 94 pressure is connected to the automatic second feed line 118 which pressure moves shuttle valve 171 to the right end against closure 174 and connects this automatic second feed pressure to the second brake line 176 to establish the second ratio drive.

With the automatic shift valve 136 in the downshift position the governor pressure acts solely through branch 144 on the governor plug 142 and at a predetermined speed overcomes the opposing biasing force of spring 163 and upshifts the automatic shift valve plug 142 and valve element 137. This upshift provides a main line hysteresis, since the second third feed pressure from line 94, which has been previously connected between the equal diameter lands *b* and *c*, is now connected between the larger land *b* and smaller land *a* to provide the upshift hysteresis force. Also exhaust 160 is closed. The second-third feed pressure line 94 is also connected to the third clutch line 161 to establish third ratio. Simultaneously, the input governor pressure in branch 146 is connected via port 147 to the ports 151 and via passages 152, 153 to the chamber 156 to provide governor pressure now acting on the larger area of land *a* of valve element 137. Since the input speed governor pressure acts on the full area of land *a*, which is larger than the area of plug 142, it provides a larger upshift force providing additional hysteresis in order to correct for the change in input speed caused by the change in ratio effected on an upshift and to provide downshifts at a lower speed than the upshift speed relative to output speed. Also, on an upshift, automatic second feed line 118 is connected to exhaust 162 regardless of the position of shuttle valve 171 and second brake line 176 with shuttle valve 171 positioned as shown is connected to exhaust 162 and with shuttle valve 171 at the opposite end connected to second ratio feed line 93 which in the 2-3 position of the manual selector valve element 67 is exhausted through bore 72 to both disengage second ratio drive and restore the inhibitor to governor control.

With the manual valve in the neutral position shown, a shift to either first or reverse may be made at any time since these are upshifts and all upshifts are uninhibited. The manual valve 66 in neutral exhausts all ratio and feed drives and on a shift to reverse or first positions respectively connects the source or main line 51 to the reverse or first drive lines to directly supply fluid under pressure to the reverse or first fluid motors to establish reverse or first drives. A shift from either reverse or first manual valve positions to neutral is inhibited and can only be made at a very low speed. On a manual valve shift from the first to the second position, the first brake line 92 is exhausted and main line pressure feed established to the manual second feed line 93 which moves the shuttle relay valve element 171 to the end 173 of the bore 172 and feeds the second ratio brake line 176 to establish second ratio. In manual valve second position the inhibitor is controlled by governor pressure and the springs to establish a predetermined speed above which a manual second to first shift cannot be made. A manual second position to second-third position shift can be made at any speed and depending on the speed control by the governor which continuously positions the automatic shift valve 136 in either the upshaft position or the downshift will establish second ratio through the automatic second line 118, shuttle valve 171 and second ratio brake line 176 or third ratio directly through the third ratio clutch line 161.

The manual valve thus provides means to supply fluid pressure, in each shift position for providing a ratio drive which is only manually established, directly to the fluid actuated ratio establishing devices which are only established manually and to supply pressures in each shift position for ratio drives which are established automatically or both automatically and manually to ratio feed or signal lines connected by automatic control valve means to the fluid actuated ratio establishing devices which are established automatically or both automatically and manually. The automatic control valve means is controlled by a speed governor signal and the manual valve ratio signals to provide either a low ratio drive or automatic shifting between the low and a high ratio drive and includes relay shuttle valve means responsive to a manual valve controlled manual low ratio signal to establish only low ratio under the control of the manual valve, and a manual valve and automatic shift valve controlled automatic low ratio signal to establish low ratio under the control of both the manual and automatic shift valves and automatic speed responsive shift valve means functioning continuously in response to speed and thus always in a proper speed responsive position, prior to a manual low to high shift, to immediately establish the proper ratio called for by a functioning speed responsive automatic shift means. The shift valve means is not disabled or blocked by manual valve controlled main line pressure during manual control operation which would require release before automatic operation could be established. The inhibitor means is controlled by the same governor signal to prevent a manual downshift which would cause a ratio drive downshift and preset under the control of the manual and automatic shift valves to permit a manual shift which maintains the same ratio drive.

The invention includes the above described and illustrated preferred embodiment and equivalent modifications thereof.

It is claimed:

1. In a transmission; an input element; an output element; a multi ratio drive gear unit connecting said input element to said output element having a low and a high fluid actuated friction device respectively providing a low and a high ratio drive selectively operable for establishing said low and high ratio drives; a source of fluid at a regulated pressure; a governor providing a governor pressure proportional to the operating speed of one of said elements; a manual valve connected to said source, having a manual low signal line and a low-high signal line and operative in a low position connecting the source of fluid pressure to said manual low signal line and in a low-high position connecting the source of fluid pressure to said low-high signal line and in each position exhausting the other of said connected lines; automatic control valve means operatively connected to said governor and said manual valve and operative in response to governor pressure to shift between a downshifted and an upshifted position and operative in either position in response to said manual low signal line pressure to supply fluid pressure to said low device to establish low drive and operative in response to said low-high signal line pressure in a downshifted position to supply fluid pressure to said low device to establish low drive and in an upshifted position to exhaust said low drive device and supply fluid pressure to said high drive device and inhibitor means operatively connected to said manual valve, automatic control valve means and said governor for controlling said manual valve, to permit at any of said operating speeds, when said automatic control valve means is downshifted, a low-high position to low position manual shift and to inhibit above a predetermined operating speed, when said automatic control valve is upshifted, a low-high position to low position manual shift.

2. In a transmission; an input element; an output element; a multi ratio drive gear unit connecting said input element to said output element having a low and a high fluid actuated friction device respectively providing a low and a high ratio drive selectively operable for establishing said low and high ratio drive; a source of fluid at a regulated pressure; a governor providing a governor pressure proportional to the operating speed of one of said elements; a manual valve connected to said source, having a manual low signal line and a low-high signal line and operative in a first position connecting the fluid pressure to said manual low signal line and exhausting said low-high signal line and in a second position connecting the fluid pressure to said low-high signal line and exhausting said manual low signal line; an automatic shift valve having an automatic low signal line and a high ratio line connected to said high friction device and operatively connected to said manual valve and biased to a downshift position connecting said low-high signal line to said automatic low signal line and connected to said governor and operative in response to governor pressure to upshift to an upshift position connecting said low-high signal line to said high ratio line; a shuttle valve having a low ratio line connected to said low ratio device connected to said manual low signal line and said automatic low signal line and operative in response to manual low signal line pressure to connect said manual low signal line to said low ratio line to establish low drive and operative in response to said automatic low signal line pressure to connect said automatic low signal line to said low ratio line to establish low drive.

3. The invention defined in claim 2 and said governor being connected to said input element and providing a governor pressure proportional to input speed and said automatic shift valve having a small area actuator and a large area actuator and said governor pressure acting on said small area actuator when the automatic shift valve is downshifted and on the large area actuator when the automatic shift valve is upshifted to correct for the low-high shift speed change and provide hysteresis resulting in a lower downshift speed than upshift speed relative to output speed.

4. The invention defined in claim 3 and said automatic shift valve having a large diameter bore portion and a small diameter bore portion with a step therebetween, a valve element having at one end a large diameter portion in said large diameter bore portion providing said large area and a small diameter governor plug having said small area mounted in said small diameter bore portion having a closed end and receiving said plug to provide a small area chamber between said plug and closed end continuously connected to said governor and receiving governor pressure to urge said plug and valve element to upshift and a large area chamber at said step and between said plug and one end of said valve element and means to exhaust said large chamber when the shift valve is downshifted and connected to said governor to said large chamber when said shift valve element is upshifted so governor pressure acts on said larger area.

5. In a transmission; an input element; an output element; a multi ratio drive gear unit connecting said input element to said output element having a low and a high fluid actuated friction device respectively providing a low and a high ratio drive selectively operable for establishing said low and high ratio drives; a source of fliud at a regulated pressure; a governor providing a governor pressure proportional to the operating speed of one of said elements; a manual valve connected to said source, having a manual low signal line and a low-high signal line and operative in a low position connecting the source of fluid pressure to said manual low signal line and exhausting said low-high signal line and in a low-high position connecting the source of fluid pressure to said low-high signal line and exhausting said manual low signal line; an automatic shift valve having an automatic low signal line and a high ratio line connected to said high friction device and operatively connected to said manual valve and biased to a downshift position connecting said low-high signal line to said automatic low signal line and connected to said governor and operative in response to governor pressure to upshift to an upshift position connecting said low-high signal line to said high ratio line; a shuttle valve having a low ratio line connected to said low ratio device and connected to said manual low signal line and said automatic low signal line and operative in response to said manual low signal line pressure to supply fluid pressure to said low ratio line to establish low drive and operative in response to automatic low signal line pressure to supply fluid pressure to said low ratio line to establish low drive; and inhibitor means connected to said manual valve, the automatic shift valve and said governor operative to normally permit manual valve shifting between said low position and low-high position when the automatic valve is downshifted and inhibiting a manual valve shift from said low-high position to said low position when the automatic valve is upshifted to prevent a manual high to low ratio drive shift above a predetermined operating speed.

6. The invention defined in claim 5 and said inhibitor means having a cam element variably positioned by said governor and being connected to said low-high signal line of said manual valve and said automatic low signal line of said automatic shift valve and said automatic low signal overcoming said governor and positioning said cam element against a stop member positioned by said low-high signal pressure.

7. In a transmission; an input element; an output element; a multi ratio drive gear unit connecting said input element to said output element having a lower, a low and a high fluid actuated friction device respectively providing a lower, a low and a high ratio device selectively operable for establishing said lower, low and high ratio drives; a source of fluid at a regulated pressure; a governor providing a governor pressure proportional to the speed of one of said elements; a manual valve connected to said source, having a lower apply line connected to said lower fluid actuator friction device, a manual low signal line and a low-high signal line and operative in a lower position connecting the source of fluid pressure to said lower apply line to engage said lower ratio drive, in a low position connecting the source of fluid pressure to said manual low signal line and in a low-position connecting the source of fluid pressure to said low-high signal line and in each position exhausting the other of said connected lines; automatic control valve means operatively connected to said governor and said manual valve and operative in response to governor pressure to shift between a downshifted and an upshifted position and operative in either position in response to said manual low signal line pressure to supply fluid pressure to said low device to establish low drive and operative in response to said low-high signal line pressure in a downshifted position to supply fluid pressure to said low device to establish low drive and in an upshifted position to exhaust said low drive device and supply fluid pressure to said high drive device and inhibitor means operatively connected to said manual valve, automatic shift valve means and said governor controlling said manual valve to inhibit, above a predetermined speed, a manual shift from said low position to said lower position, to permit at any speed, when said automatic shift valve means is downshifted, a manual low-high position to low position shift and to inhibit above a predetermined speed, when said shift valve is upshifted, a manual low-high position to low position shift.

8. In a transmission; an input element; an output element; a multi ratio drive gear unit connecting said input element to said output element having a lower, a low and a high fluid actuated friction device respectively providing a lower, a low and a high ratio drive selectively operable for establishing said lower, low and high ratio drives; a source of fluid at a regulated pressure; a governor providing a governor pressure proportional to the speed of one of said elements; a manual valve connected to said source, having a lower apply line connected to said lower fluid actuated friction device, a manual low signal line and a low-high signal line and operative in a lower position connecting the source fluid pressure to said lower apply line to engage said lower ratio drive, in a low position connecting the source of fluid pressure to said manual low signal line and in a low-high position connecting the source of fluid pressure to said low-high signal line and in each position exhausting the other of said connected lines; an automatic shift valve having an automatic low signal line and a high ratio line connected to said high friction device and operatively connected to said manual valve and biased to a downshift position connecting said low-high signal line to said automatic low signal line and connected to said governor and operative in response to governor pressure to upshift to an upshift position connecting said low-high signal line to said high ratio line; a shuttle valve having a low ratio line connected to said low ratio device connected to said manual low signal line and said automatic low signal line and operative in response to said manual low signal line pressure to supply fluid pressure to said low ratio line to establish low drive and operative in response to automatic low signal line pressure to supply fluid under pressure to said low ratio line to establish low drive; and inhibitor means connected to said manual valve, said automatic shift valve and said governor operative to permit manual valve shifting between low position and low-high position when the automatic valve is downshifted and inhibiting a manual valve low-high position to low position shift when the automatic valve is upshifted to prevent a manual high to low ratio drive shift above a predetermined speed, and inhibiting a manual valve shift from said low position to said lower position above a predetermined speed.

9. The invention defined in claim 8 and said inhibitor means having a cam element variably positioned by said governor and being connected to said low-high signal line of said manual valve and said automatic low signal line of said automatic shift valve and said automatic low signal overcoming said governor and positioning said cam element against a stop member positioned by said low-high signal pressure.

* * * * *

PO-1050
(5/69)

UNITED STATES PATENT OFFICE
CERTIFICATE OF CORRECTION

Patent No. 3,789,698          Dated February 5, 1974

Inventor(s) Richard H. Williams

It is certified that error appears in the above-identified patent and that said Letters Patent are hereby corrected as shown below:

In the Specification: Column 1, line 17, "shirf" should be -- shift --; column 1, line 24, after "control" insert -- shifts --;

column 1, line 49, delete "inhibitor controls" and insert therefor -- a --; column 3, line 24, after "motors" insert -- exhausted --; column 4, line 7, "perimater" should be -- perimeter --; column 4, line 17, after "diameter" insert -- lands --; column 5, line 10, after "governor" insert -- pressure --; column 5, line 62, after "shift" delete "valve 136 and shuttle valve 171, controls the shift"; column 6, line 49, after "bore" insert -- portion --; column 6, line 62, after "drive" insert -- brake --; column 7, line 4, "shaft" should be -- shift --; column 8, line 5, "upshaft" should be -- upshift --.

In the Claims: Claim 7, column 10, line 63, "device" should be -- drive --; claim 7, column 11, line 8, "low-position" should be -- low-high position --.

Column 1, line 48, "inhibitorscontrols" should be -- inhibitor control --.

Signed and sealed this 5th day of November 1974.

(SEAL)
Attest:

McCOY M. GIBSON JR.
Attesting Officer

C. MARSHALL DANN
Commissioner of Patents